US007258032B2

(12) United States Patent
Kim

(10) Patent No.: US 7,258,032 B2
(45) Date of Patent: *Aug. 21, 2007

(54) DOUBLE CLUTCH TRANSMISSION

(75) Inventor: In Chan Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 244 days.

This patent is subject to a terminal disclaimer.

(21) Appl. No.: 11/006,252

(22) Filed: Dec. 7, 2004

(65) Prior Publication Data

US 2005/0081661 A1 Apr. 21, 2005

(30) Foreign Application Priority Data

Dec. 10, 2003 (KR) .................. 10-2003-0089555

(51) Int. Cl.
*F16H 3/08* (2006.01)

(52) U.S. Cl. .................. 74/330; 74/331; 74/333; 74/340

(58) Field of Classification Search .................. 74/325, 74/329, 330, 331, 333, 340
See application file for complete search history.

(56) References Cited

U.S. PATENT DOCUMENTS 4,106,364 A * 8/1978 Zenker et al. .............. 74/745
4,461,188 A * 7/1984 Fisher ...................... 74/330
4,799,395 A * 1/1989 Janiszewski ................ 74/331
6,209,407 B1 * 4/2001 Heinzel et al. .............. 74/331
6,638,197 B2 * 10/2003 Ogawa et al. .............. 477/174
6,766,705 B1 * 7/2004 Hall III ...................... 74/331
6,973,849 B2 * 12/2005 Hosono ...................... 74/330
7,066,043 B2 * 6/2006 Kim et al. .................. 74/330
2005/0130795 A1 * 6/2005 Kim et al. .................. 475/332
2005/0252325 A1 * 11/2005 Stevenson ................... 74/325
2006/0169078 A1 * 8/2006 Hiraiwa ...................... 74/331

FOREIGN PATENT DOCUMENTS

| DE | 10223226 A1 | 2/2003 |
| DE | 10153014 A1 | 5/2003 |
| DE | 10316070 A1 | 10/2003 |
| EP | 0288779 A2 | 11/1988 |
| EP | 1124079 A2 | 8/2001 |

* cited by examiner

*Primary Examiner*—David D. Le
(74) *Attorney, Agent, or Firm*—Morgan Lewis & Bockius LLP

(57) ABSTRACT

Engine torque selectively inputted through first and second input shafts is received and changed selectively by first and second output devices respectively having first and second output shafts. A reverse driven gear is axially offset from drive gears on the first and second input shafts such that some gear teeth of the reverse driven gear are close to an exterior circumference of one of the first and second input shafts.

9 Claims, 7 Drawing Sheets

DOUBLE CLUTCH TRANSMISSION

CROSS-REFERENCE TO RELATED APPLICATIONS

This application claims priority of Korean Application No. 10-2003-0089555, filed Dec. 10, 2003, the disclosure of which is incorporated herein by reference.

FIELD OF THE INVENTION

Generally, the present invention relates to a double clutch transmission. More particularly, the present invention relates to a double clutch transmission having, in addition to a reduced length and enhanced power transmission efficiency, an enhanced allowable range of reduction ratio for a reverse speed due to an increase of diameter of a reverse driven gear by disposing the reverse driven gear apart from drive gears on input shafts.

BACKGROUND OF THE INVENTION

Generally a double clutch transmission implies a transmission having two clutch devices therein. A double clutch transmission generally receives torque input from an engine selectively at its two input shafts using two clutches. The double clutch transmission then changes the torque and speed using gears on the two input shafts, and outputs the chosen torque and speed.

Such a double clutch transmission has been devised basically to compactly provide a multi-speed transmission of higher than five speeds. The two clutches and synchronizing devices included in a double clutch transmission may be controlled by a controller, and accordingly, such a double clutch transmission may also realize an automated shift gear (ASG) that eliminates the necessity of a driver's manual shifting.

A clutch included in a double clutch transmission may be categorized as a dry-type clutch or a wet-type clutch based on its operation. A dry-type clutch utilizes the same principle as a clutch device conventionally disposed between an engine and a manual transmission. A wet-type clutch utilizes the same principle as a clutch device inside an automatic transmission.

A wet-type clutch generally has a higher torque capacity than a dry-type clutch. Therefore, for an engine of high output power, a wet-type clutch is appropriate. In order to stably transmit a high output torque of a high powered engine, the widths of the gears in the transmission must be large. Therefore, a double clutch transmission designed for a high torque engine may easily become very large.

However, double-clutch transmissions that address the above drawback have a reverse driven gear that axially corresponds to a drive gear on the input shafts. In such a case, a diameter of the reverse driven gear is limited by the corresponding drive gear so that a reverse speed may only have very small reduction ratio relative to a first speed.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a double clutch transmission having non-limiting advantages of, in addition to a reduced length and enhanced power transmission efficiency, an enhanced allowable range of a reduction ratio for a reverse speed due to an increase in diameter of a reverse driven gear. This is achieved by disposing the reverse driven gear apart from drive gears on the input shafts.

An exemplary double clutch transmission according to an embodiment of the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts; a drive gear unit including a plurality of drive gears disposed respectively on the first and second input shafts; a first output device including a first output shaft disposed parallel to and apart from the main input shaft by a predetermined distance and having a plurality of driven gears and a first output gear thereon, such that torques of drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts.

The drive gear unit may include: first, third, and fifth drive gears formed on one input shaft among the first and second input shafts; and second and fourth drive gears formed on another input shaft among the first and second input shafts. The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the fifth and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fifth driven gear such that some of the gear teeth of the reverse driven gear are close to an exterior circumference of an input shaft between the first and third drive gears; a third synchronizing device for selectively transmitting torques of the fifth driven gear and the reverse driven gear to the second output shaft; a fourth synchronizing device for selectively transmitting a torque of the sixth driven gear to the second output shaft; and the second output gear disposed on the second output shaft and engaged with the differential gear, such that torques of the first, fourth, and fifth drive gears on the first and second input shafts are selectively changed and output.

The first, second, third, fourth, and fifth drive gears may be disposed in a sequence of the first drive gear, the third drive gear, the fifth drive gear, the second drive gear, and the fourth drive gear. The first, second, third, fourth, and fifth drive gears may be disposed in a sequence of the fifth drive gear, the third drive gear, the first drive gear, the second drive gear, and the fourth drive gear.

The first, third, and fifth drive gears may be formed on the first input shaft; and the second and fourth drive gears may be formed on the second input shaft. The drive gear unit may include: first and third drive gears formed on one input shaft among the first and second input shafts; and second and fourth drive gears formed on another input shaft among the first and second input shafts.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the sixth driven gear such that some of the gear teeth of the reverse driven gear are close to an exterior circumference of an input shaft between the first and second drive gears; a third synchronizing device for selectively transmitting a torque of the fifth driven gear to the second output shaft; a fourth synchronizing device for selectively transmitting torques of the sixth driven gear and the reverse driven gear to the second output shaft; and the second output gear disposed on the second output shaft and engaged with the differential gear, such that torques of the first, third, and fourth drive gears on the first and second input shafts are selectively changed and output.

The second output device may include: the second output shaft; fifth and sixth driven gears disposed on the second output shaft and respectively engaged with the third and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fifth driven gear such that some of the gear teeth of the reverse driven gear are close to an exterior circumference of an input shaft between the first and third drive gears; a third synchronizing device for selectively transmitting torques of the fifth driven gear and the reverse driven gear to the second output shaft; a fourth synchronizing device for selectively transmitting a torque of the sixth driven gear to the second output shaft; and the second output gear disposed on the second output shaft and engaged with the differential gear, such that torques of the first, third, and fourth drive gears on the first and second input shafts are selectively changed and output.

The first, second, third and fourth drive gears may be disposed in a sequence of the third drive gear, the first drive gear, the second drive gear, and the fourth drive gear. The first, second, third and fourth drive gears may be disposed in a sequence of the first drive gear, the third drive gear, the fourth drive gear, and the second drive gear.

The first and third drive gears may be formed on the first input shaft; and the second and fourth drive gears may be formed on the second input shaft. The drive gear unit may include: first and third drive gears formed on one input shaft among the first and second input shafts; and second, fourth and sixth drive gears formed on another input shaft among the first and second input shafts.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and sixth drive gears; a first mediating gear engaged with the first drive gear; a second mediating gear connected to the first mediating gear by an idle shaft; the reverse driven gear engaged with the second mediating gear and disposed on the second output shaft between the sixth driven gear and the second output gear such that some of the gear teeth of the reverse driven gear are close to an exterior circumference of an input shaft between the second and fourth drive gears; a third synchronizing device for selectively transmitting a torque of the fifth driven gear to the second output shaft; a fourth synchronizing device for selectively transmitting torques of the sixth driven gear and the reverse driven gear to the second output shaft; and the second output gear disposed on the second output shaft and engaged with the differential gear, such that torques of the first, third, and sixth drive gears on the first and second input shafts are selectively changed and output.

The first, second, third, fourth and sixth drive gears may be disposed in a sequence of the third drive gear, the first drive gear, the sixth drive gear, the second drive gear, and the fourth drive gear. The first and third drive gears may be formed on the first input shaft; and the second, fourth, and sixth drive gears may be formed on the second input shaft.

The drive gear unit may include: first and third drive gears formed on one input shaft among the first and second input shafts; and second, fourth and sixth drive gears formed on another input shaft among the first and second input shafts. The first output device may include: the first output shaft; first, second, and third driven gears disposed on the first output shaft and respectively engaged with the first, second, and third drive gears; a first synchronizing device for selectively transmitting torques of the first and third driven gears to the first output shaft; a second synchronizing device for selectively transmitting a torque of the second driven gear to the first output shaft; and the first output gear disposed on the first output shaft and engaged with the differential gear, such that torque of the first, second, and third drive gears on the first and second input shafts are selectively changed and output.

The second output device may include: the second output shaft; fourth, fifth, and sixth driven gears disposed on the second output shaft and respectively engaged with the fourth, third, and sixth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fourth driven gear such that some of the gear teeth of the reverse driven gear are close to an exterior circumference of an input shaft between the first and fourth drive gears; a third synchronizing device for selectively transmitting torques of the fifth driven gear and the reverse driven gear to the second output shaft; a fourth synchronizing device for selectively transmitting torques of the fourth and sixth driven gears to the second output shaft; and the second output gear disposed on the second output shaft and engaged with the differential gear, such that torques of the first, third, fourth, and sixth drive gears on the first and second input shafts are selectively changed and output.

The first, second, third, fourth and sixth drive gears may be disposed in a sequence of the third drive gear, the first drive gear, the fourth drive gear, the second drive gear, and the sixth drive gear. The first and third drive gears may be formed on the first input shaft; and the second, fourth, and sixth drive gears may be formed on the second input shaft.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts; first, third, and fifth drive gears formed on one input shaft among the first and second input shafts; second and fourth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, third, and fourth drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, fourth, and fifth drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the fifth and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fifth driven gear such that some of the gear teeth of the reverse driven gear are close to an exterior circumference of the first input shaft between the first and third drive gears; a third synchronizing device for selectively transmitting torques of the fifth driven gear and the reverse driven gear to the second output shaft; a fourth synchronizing device for selectively transmitting a torque of the sixth driven gear to the second output shaft; and the second output gear disposed on the second output shaft and engaged with the differential gear, such that torques of the first, fourth, and fifth drive gears on the first and second input shafts are selectively changed and output.

The first, second, third, fourth, and fifth drive gears may be disposed in a sequence of the first drive gear, the third drive gear, the fifth drive gear, the second drive gear, and the fourth drive gear on the first and second input shafts. The first, second, third, fourth, and fifth drive gears may be disposed in a sequence of the fifth drive gear, the third drive gear, the first drive gear, the second drive gear, and the fourth drive gear.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts; first and third drive gears formed on one input shaft among the first and second input shafts; second and fourth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, third, and fourth drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, third, and fourth drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the sixth driven gear such that some of the gear teeth of the reverse driven gear are close to an exterior circumference of the first input shaft between the first and second drive gears; a third synchronizing device for selectively transmitting a torque of the fifth driven gear to the second output shaft; a fourth synchronizing device for selectively transmitting torques of the sixth driven gear and the reverse driven gear to the second output shaft; and the second output gear disposed on the second output shaft and engaged with the differential gear, such that torques of the first, third, and fourth drive gears on the first and second input shafts are selectively changed and output.

The second output device may include: the second output shaft; fifth and sixth driven gears disposed on the second output shaft and respectively engaged with the third and fourth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fifth driven gear such that some of the gear teeth of the reverse driven gear are close to an exterior circumference of the first input shaft between the first and third drive gears; a third synchronizing device for selectively transmitting torques of the fifth driven gear and the reverse driven gear to the second output shaft; a fourth synchronizing device for selectively transmitting a torque of the sixth driven gear to the second output shaft; and the second output gear disposed on the second output shaft and engaged with the differential gear, such that torques of the first, third, and fourth drive gears on the first and second input shafts are selectively changed and output.

The first, second, third, and fourth drive gears may be disposed in a sequence of the third drive gear, the first drive gear, the second drive gear, and fourth drive gear. The first, second, third, and fourth drive gears may be disposed in a sequence of the first drive gear, the third drive gear, the fourth drive gear, and the second drive gear.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts; first and third drive gears formed on one input shaft among the first and second input shafts; second, fourth, and sixth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, third, and fourth drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, third, and sixth drive gears on the first and second input shafts are selectively changed and output; and a differential gear commonly connected to the first output gear and the second output gear, wherein the reverse driven gear is axially offset from the drive gears on the first and second input shafts such that some of gear teeth of the reverse driven gear are close to an exterior circumference of one of the first and second input shafts.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and sixth drive gears; a first mediating gear engaged with the first drive gear; a second mediating gear connected to the first mediating gear by an idle shaft; the reverse driven gear engaged with the second mediating gear and disposed on the second output shaft between the sixth driven gear and the second output gear such that some of the gear teeth of the reverse driven gear are close to an exterior circumference of the second input shaft between the second and fourth drive gears; a third synchronizing device for selectively transmitting a torque of the fifth driven gear and the reverse driven gear to the second output shaft; a fourth synchronizing device for selectively transmitting torques of the sixth driven gear and the reverse driven gear to the second output shaft; and the second output gear disposed on the second output shaft and engaged with the differential gear, such that torques of the first, third, and sixth drive gears on the first and second input shafts are selectively changed and output.

The first, second, third, fourth, and sixth drive gears may be disposed in a sequence of the third drive gear, the first drive gear, the sixth drive gear, the second drive gear, and the fourth drive gear.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts; first and third drive gears formed on one input shaft among the first and second input shafts; second, fourth, and sixth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, and third drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, third, fourth, and sixth drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts.

The first output device may include: the first output shaft; first, second, and third driven gears disposed on the first output shaft and respectively engaged with the first, second, and third drive gears; a first synchronizing device for selectively transmitting torques of the first and third driven gears to the first output shaft; a second synchronizing device for selectively transmitting a torque of the second driven gear to the first output shaft; and the first output gear disposed on the first output shaft and engaged with the differential gear, such that torques of the first, second, and third drive gears on the first and second input shafts are selectively changed and output.

The second output device may include: the second output shaft; fourth, fifth, and sixth driven gears disposed on the second output shaft and respectively engaged with the fourth, third, and sixth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fourth driven gear such that some of the gear teeth of the reverse driven gear are close to an exterior circumference of the second input shaft between the first and fourth drive gears; a third synchronizing device for selectively transmitting torques of the fifth driven gear and the reverse driven gear to the second output shaft; a fourth synchronizing device for selectively transmitting torques of the forth driven gear and sixth driven gear to the second output shaft; and the second output gear disposed on the second output shaft and engaged with the differential gear, such that torques of the first, third, fourth, and sixth drive gears on the first and second input shafts are selectively changed and output.

The first, second, third, fourth, and sixth drive gears may be disposed in a sequence of the third drive gear, the first drive gear, the fourth drive gear, the second drive gear, and the sixth drive gear.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Embodiments of the present invention will hereinafter be described in detail with reference to the accompanying drawings.

Figure 1:
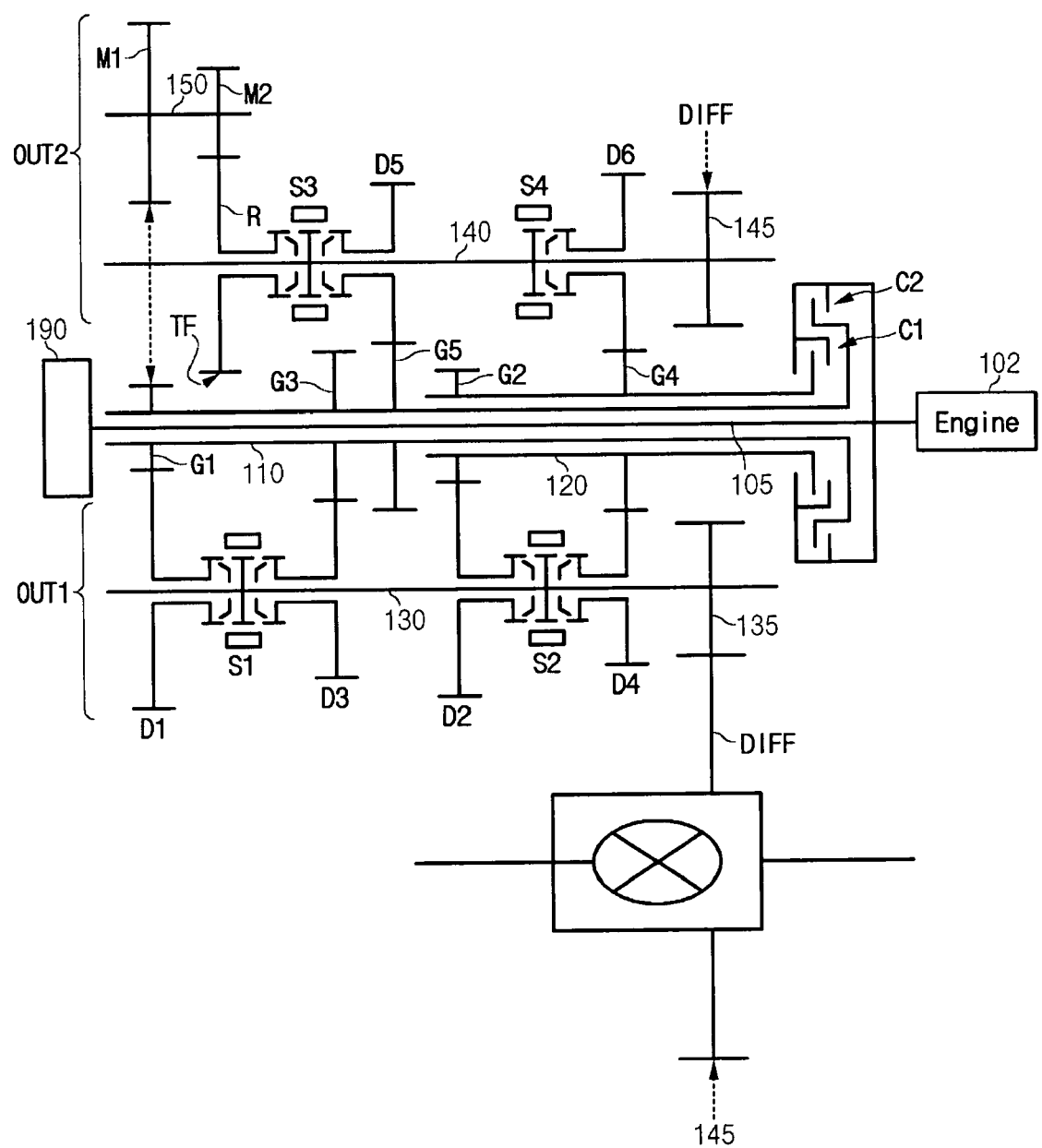
FIG. 1 is a schematic diagram of a double clutch transmission according to a first embodiment of the present invention.

FIG. 1 is a schematic diagram of a double clutch transmission according to a first embodiment of the present invention.

As shown in FIG. 1, a double clutch transmission according to a first embodiment of the present invention includes a main input shaft 105; first and second input shafts 110 and 120; first and second clutches C1 and C2; first, second, third, fourth, and fifth drive gears G1, G2, G3, G4, and G5; first and second output devices OUT1 and OUT2; and a differential gear DIFF.

The main input shaft 105 receives a torque from an engine 102. The first input shaft 110 may rotate coaxially about the main input shaft 105.

FIG. 1 illustrates that the main input shaft 105 penetrates through the first input shaft 110 to be connected to an oil pump 190. This is only to exemplarily show that a double clutch transmission of the present invention may be realized as a wet type. Therefore, it should not be understood that the scope of the present invention is limited to as shown in FIG. 1. For example, in a dry-type double clutch transmission, the first input shaft 110 may be formed as a rod having no interior space.

The second input shaft 120 may rotate coaxially about the main input shaft 105 and about the first input shaft 110. The first and second clutches C1 and C2 selectively transmit a torque from the main input shaft 105 to the first and/or second input shafts 110 and 120. Therefore, the torque of the main input shaft 105 may be transmitted to the first input shaft 110 under an operation of the first clutch C1, and to the second input shaft 120 under an operation of the second clutch C2.

The first, third, and fifth drive gears G1, G3, and G5 are formed on the first input shaft 110, and the second and fourth drive gears G2 and G4 are formed on the second input shaft 120. In further detail, the first, third, and fifth drive gears G1, G3, and G5 may be disposed on the first input shaft 110 such that an end of the second input shaft 120 is closest to the fifth drive gear G5, further to the third drive gear G3, and farthest from the first drive gear G1. In addition, the second and fourth drive gears G2 and G4 may be disposed on the second input shaft 120 such that the engine 102 is closer to the fourth drive gear G4 than to the second drive gear G2. In other words, regarding disposition of such drive gears, referring to FIG. 1 related to a first embodiment of the present invention, the first, second, third, fourth, and fifth drive gears G1, G2, G3, G4, and G5 are disposed in a sequence of the first drive gear G1, the third drive gear G3, the fifth drive gear G5, the second drive gear G2, and the fourth drive gear G4.

As shown in FIG. 1, a double clutch transmission, according to an embodiment of the present invention, further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, fourth, and fifth drive gears G1, G4, and G5, and outputs the changed torques.

As shown in FIG. 1, the first output device OUT1 includes a first output shaft 130, first, second, third, and fourth driven gears D1, D2, D3, and D4, first and second synchronizing devices S1 and S2, and a first output gear 135.

The first output shaft 130 is disposed parallel to and apart from the main input shaft 105 by a predetermined distance. The first, second, third, and fourth driven gears D1, D2, D3, and D4 are disposed on the first output shaft 130, and are respectively engaged with the first, second, third, and fourth drive gears G1, G2, G3, and G4.

The first synchronizing device S1 selectively transmits torques from the first and third driven gears D1 and D3 to the first output shaft 130. The second synchronizing device S2 selectively transmits torques of the second and fourth driven gears D2 and D4 to the first output shaft 130.

In addition, the first output gear 135 is disposed on the first output shaft 130 and engaged with the differential gear DIFF such that selectively changed torques of the first, second, third, and fourth drive gears G1, G2, G3, and G4 may be output therethrough to the differential gear DIFF.

As shown in FIG. 1, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145.

The second output shaft 140 is disposed parallel to and apart from the main input shaft 105 by a predetermined distance. The fifth and sixth driven gears D5 and D6 are disposed on the second output shaft 140, and are respectively engaged with the fifth and fourth drive gears G5 and G4.

The first mediating gear M1 is engaged with the first drive gear G1, and the second mediating gear M2 is connected to the first mediating gear M1 by an idle shaft 150.

The reverse driven gear R is engaged with the second mediating gear M2 and is disposed on the second output shaft 140 between the first mediating gear M1 and the fifth driven gear D5. Gear teeth (more specifically, outer surface of gear teeth) TF of the reverse driven gear R lie close to an exterior circumference of the first input shaft between the first and third drive gears G1 and G3.

The third synchronizing device S3 selectively transmits torques of the fifth driven gear D5 and the reverse driven gear R to the second output shaft 140. The fourth synchronizing device S4 selectively transmits a torque of the sixth driven gear D6 to the second output shaft 140.

In addition, the second output gear 145 is disposed on the second output shaft 140 and engaged with the differential gear DIFF such that selectively changed torques of the first, fourth, and fifth drive gears G1, G4, and G5 may be output therethrough to the differential gear DIFF.

Details of the first, second, third, and fourth synchronizing devices S1, S2, S3, and S4 may be obviously realized by a person of ordinary skill in the art referring to synchronizing devices of a conventional manual transmission.

An embodiment of the present invention may further include first, second, third, and fourth actuators (not shown) respectively for actuating the first, second, third, and fourth synchronizing devices S1, S2, S3, and S4 to the left and right in FIG. 1. In this case, the first, second, third, and fourth actuators (not shown) may be driven by a controller (not shown).

FIG. 1 does not illustrate a connection between the first mediating gear M1 and the first drive gear G1, or a connection between the second output shaft 140 and the differential gear DIFF. This is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF appears in FIG. 2.

Figure 2:
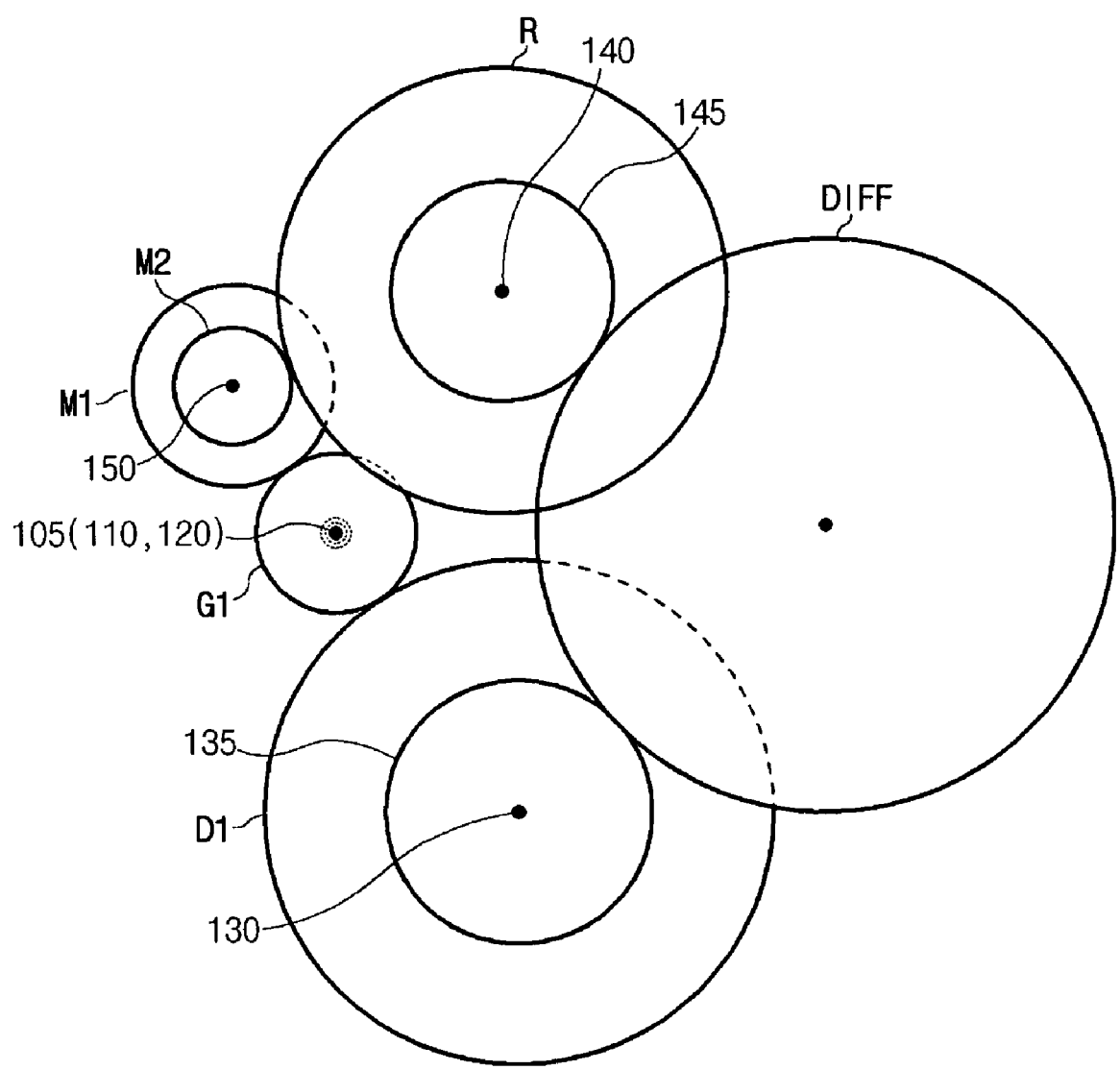
FIG. 2 is a drawing for illustrating a spatial relationship of an idle shaft for a reverse speed, a differential gear, first and second input shafts, and first and second output shafts of a double clutch transmission according to a first embodiment of the present invention.

FIG. 2 is a drawing illustrating a spatial relationship of an idle shaft 150 for a reverse speed, a differential gear DIFF, first and second input shafts 110 and 120, and first and second output shafts 130 and 140 of a double clutch transmission according to an embodiment of the present invention. FIG. 2 is a view of FIG. 1 seen from the right thereof along the length of the axes. Some gears shown in FIG. 1 are intentionally not shown in FIG. 2 for better understanding of the spatial relationship among the rotation axes of the rotating elements.

As shown in FIG. 2, the first and second output shafts 130 and 140 are disposed apart from the second input shaft 120. The idle shaft 150 for a reverse speed is disposed at a position at which it may form a triangle together with the first input shaft 110 and the second output shaft 140. The first mediating gear M1 on the idle shaft 150 is engaged with the first drive gear G1 of the first input shaft 110. The second mediating gear M2 on the idle shaft 150 is engaged with the reverse driven gear R of the second output shaft 140.

The differential gear DIFF is disposed at a position in which it may form a triangle together with the first and second output shafts 130 and 140, so that the differential gear DIFF is commonly engaged with the first and second output gears 135 and 145 of the first and second output shafts 130 and 140.

According to such structural features of a double clutch transmission, disposition of only five drive gears on input shafts may enable a total of seven speeds, i.e., six forward speeds and one reverse speed. Therefore, the length and/or size of a forward six-speed double clutch transmission may be greatly shortened. In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

The reverse driven gear R is disposed at a position in which the gear teeth (more specifically, the outer surface of the gear teeth) TF of the reverse driven gear are close to an exterior circumference of the first input shaft 110 between the first and third drive gears G1 and G3. Therefore, the diameter of the reverse driven gear R may be maximized so as to realize a maximal reduction ratio for a reverse speed of as large as a reduction ratio for a first speed.

Referring back to FIG. 1, shifting operations of such a double clutch transmission according to a first embodiment of the present invention are hereinafter described in detail. When the first synchronizing device S1 is driven to the left in FIG. 1 and the first clutch C2 is operated, a torque of the engine 102 is transmitted to the first input shaft 110 such that a first speed is realized.

For shifting to the second speed, firstly, the second driven gear D2 and the first output shaft 130 are synchronously engaged by operating the second synchronizing device S2 to the left in FIG. 1. This is performed while the first clutch C1 operates and the second clutch C2 is released.

For shifting to the third speed, firstly, the third driven gear D3 and the first output shaft 130 are synchronously engaged by operating the first synchronizing device S1 to the right in FIG. 1. This is performed while the first clutch C1 is released and the second clutch C2 operates.

For shifting to the fourth speed, firstly, the fourth driven gear D4 and the first output shaft 130 are synchronously engaged by operating the second synchronizing device S2 to the right in FIG. 1. This is performed while the first clutch C1 operates and the second clutch C2 is released.

For shifting to the fifth speed, firstly, the fifth driven gear D5 and the second output shaft 140 are synchronously engaged by operating the third synchronizing device S3 to the right in FIG. 1. This is performed while the first clutch C1 is released and the second clutch C2 operates.

For shifting to the sixth speed, firstly, the sixth driven gear D6 and the second output shaft 140 are synchronously engaged by operating the fourth synchronizing device S4 to the right in FIG. 1. This is performed while the first clutch C1 operates and the second clutch C2 is released.

For shifting to the reverse speed, firstly, the reverse driven gear R and the second output shaft 140 are synchronously engaged by operating the third synchronizing device S3 to the left in FIG. 1. This is performed while the first clutch C1 is released and the second clutch C2 operates. The reverse speed having a large reduction ratio of as much as the first speed.

As can be seen from the above shifting process, the clutches required to be operated for obtaining adjacent speeds alternate. In addition, adjacent speeds require different synchronizing devices to be operated. Therefore, a release of a current gear speed and a realization of a target gear/speed may be independently controlled during shifting from and to adjacent gears/speeds. In addition, during shifting to an adjacent gear/speed, a driver may perform various techniques on a manual transmission, e.g., a half-clutch operation, by controlling engagement timing of an oncoming clutch and release timing of an off-going clutch.

Figure 3:
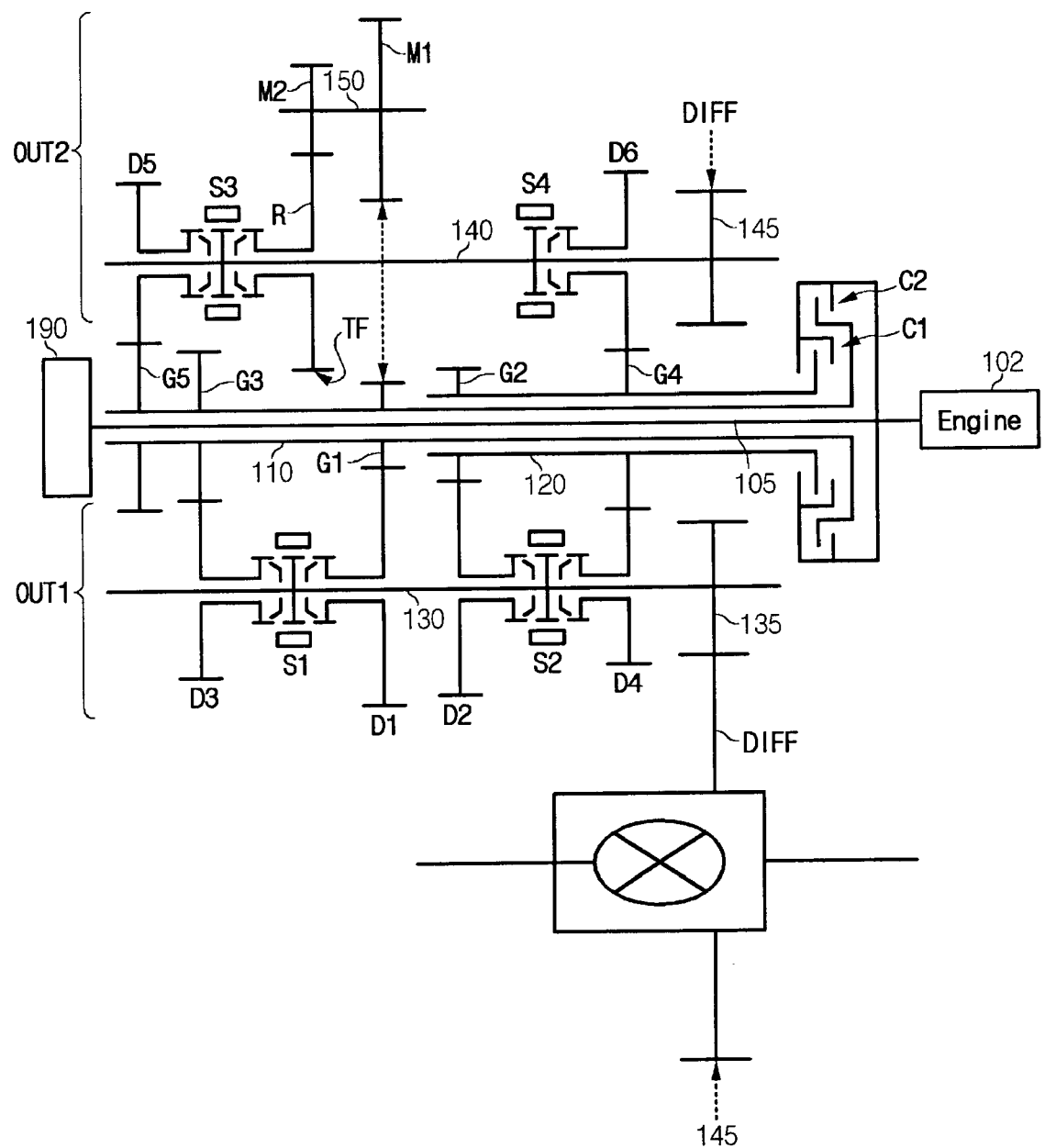
FIG. 3 is a schematic diagram of a double clutch transmission according to a second embodiment of the present invention.

FIG. 3 is a schematic diagram of a double clutch transmission according to a second embodiment of the present invention. As shown in FIG. 3, a double clutch transmission according to a second embodiment of the present invention includes, the same as in the first embodiment, a main input shaft 105; first and second input shafts 110 and 120; first and second clutches C1 and C2; first, second, third, fourth, and fifth drive gears G1, G2, G3, G4, and G5; first and second output devices OUT1 and OUT2; and a differential gear DIFF.

Details of the main input shaft 105, first and second input shafts 110 and 120, first and second clutches C1 and C2, and the cooperative relationship thereamong of a double clutch transmission according to a second embodiment are the same as has been described in connection with the first embodiment.

The first, third, and fifth drive gears G1, G3, and G5 according to the second embodiment are formed on the first input shaft 110, and the second and fourth drive gears G2 and G4 are formed on the second input shaft 120.

In further detail, the first, third, and fifth drive gears G1, G3, and G5 may be disposed on the first input shaft 110 such that an end of the second input shaft 120 is closest to the first drive gear G1, further to the third drive gear G3, and farthest from the fifth drive gear G5. In addition, the second and fourth drive gears G2 and G4 are disposed on the second input shaft 120 such that the engine 102 is closer to the fourth drive gear G4 than to the second drive gear G2. In other words, regarding disposition of such drive gears, referring to FIG. 3 related to a second embodiment of the present invention, the first, second, third, fourth, and fifth drive gears G1, G2, G3, G4, and G5 are disposed in a sequence of the fifth drive gear G5, the third drive gear G3, the first drive gear G1, the second drive gear G2, and the fourth drive gear G4.

As shown in FIG. 3, a double clutch transmission according to a second embodiment of the present invention further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, fourth, and fifth drive gears G1, G4, and G5, and outputs the changed torques.

As shown in FIG. 3, the first output device OUT1 includes a first output shaft 130; first, second, third, and fourth driven gears D1, D2, D3, and D4; first and second synchronizing devices S1 and S2; and a first output gear 135. The first output shaft 130 is disposed parallel to and apart from the main input shaft 105 by a predetermined distance. The first, second, third, and fourth driven gears D1, D2, D3, and D4 are disposed on the first output shaft 130, and they are respectively engaged with the first, second, third, and fourth drive gears G1, G2, G3, and G4.

The first synchronizing device S1 selectively transmits torques from the first and third driven gears D1 and D3 to the first output shaft 130. The second synchronizing device S2 selectively transmits torques from the second and fourth driven gears D2 and D4 to the first output shaft 130. In addition, the first output gear 135 is disposed on the first output shaft 130 and engaged with the differential gear DIFF such that selectively changed torques of the first, second, third, and fourth drive gears G1, G2, G3, and G4 may be output therethrough to the differential gear DIFF.

As shown in FIG. 3, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145.

The second output shaft 140 is disposed parallel to and apart from the main input shaft 105 by a predetermined distance. The fifth and sixth driven gears D5 and D6 are disposed on the second output shaft 140, and are respectively engaged with the fifth and fourth drive gears G5 and G4. The first mediating gear M1 is engaged with the first drive gear G1, and the second mediating gear M2 is connected to the first mediating gear M1 by an idle shaft 150.

The reverse driven gear R is engaged with the second mediating gear M2 and is disposed on the second output shaft 140 between the first mediating gear M1 and the fifth driven gear D5. Gear teeth (more specifically, outer surfaces of gear teeth) TF of the reverse driven gear R lie close to an exterior circumference of the first input shaft between the first and third drive gears G1 and G3.

The third synchronizing device S3 selectively transmits torques from the fifth driven gear D5 and the reverse driven gear R to the second output shaft 140. The fourth synchronizing device S4 selectively transmits a torque from the sixth driven gear D6 to the second output shaft 140. In addition, the second output gear 145 is disposed on the second output shaft 140 and engaged with the differential gear DIFF such that selectively changed torques of the first, fourth, and fifth drive gears G1, G4, and G5 may be output therethrough to the differential gear DIFF.

Details of the first, second, third, and fourth synchronizing devices S1, S2, S3, and S4 are the same as has been described in connection with the first embodiment. Differences related to the first, second, third, and fourth synchronizing devices S1, S2, S3, and S4 in comparison with the first embodiment are as follows: the first driven gear D1 is connected to the right of the first synchronizing device S1, and the third driven gear D3 is connected to the left thereof; the fifth driven gear D5 is connected to the left of the third synchronizing device S3, and the reverse driven gear R is connected to the right thereof.

FIG. 3 does not illustrate a connection between the first mediating gear M1 and the first drive gear G1, or a connection between the second output shaft 140 and the differential gear DIFF. As in the first embodiment, this is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF is the same as has been described in connection with the first embodiment with reference to FIG. 2.

According to such structural features of a double clutch transmission, disposition of only five drive gears on input shafts may enable a total of seven speeds, i.e., six forward speeds and one reverse speed. Therefore, the length of a forward six-speed double clutch transmission may be shortened. In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

The reverse driven gear R is disposed at a position such that some of the gear teeth (more specifically, the outer surface of the gear teeth) TF of the reverse driven gear are close to an exterior circumference of the first input shaft 110 between the first and third drive gears G1 and G3. Therefore, the diameter of the reverse driven gear R may be maximized so as to realize a maximal reduction ratio for a reverse speed of as large as a reduction ratio for a first speed.

Referring to FIG. 3, shifting operations of such a double clutch transmission according to a second embodiment of the present invention are hereinafter described in detail. For shifting operations of a double clutch transmission to second, fourth, and sixth speeds according to a second embodiment of the present invention, clutches and synchronizing devices are operated in the same manner that has been described in connection with the first embodiment. For shifting to the first speed, the first driven gear D1 and the first output shaft 130 are synchronously engaged by operating the first synchronizing device S1 to the right in FIG. 3. This is performed while the clutch C2 is engaged and the clutch C1 is released.

For shifting to the third speed, firstly, the third driven gear D3 and the first output shaft 130 are synchronously engaged by operating the first synchronizing device S1 to the left in FIG. 3. This is performed while the first clutch C1 is released and the second clutch C2 operates.

For shifting to the fifth speed, firstly, the fifth driven gear D5 and the second output shaft 140 are synchronously engaged by operating the third synchronizing device S3 to the left in FIG. 3. This is performed while the first clutch C1 is released and the second clutch C2 operates.

For shifting to the reverse speed, firstly, the reverse driven gear R and the second output shaft 140 are synchronously engaged by operating the third synchronizing device S3 to the right in FIG. 3. This is performed while the first clutch C1 is released and the second clutch C2 operates. The reverse speed having a large reduction ratio of as much as that of the first speed.

Figure 4:
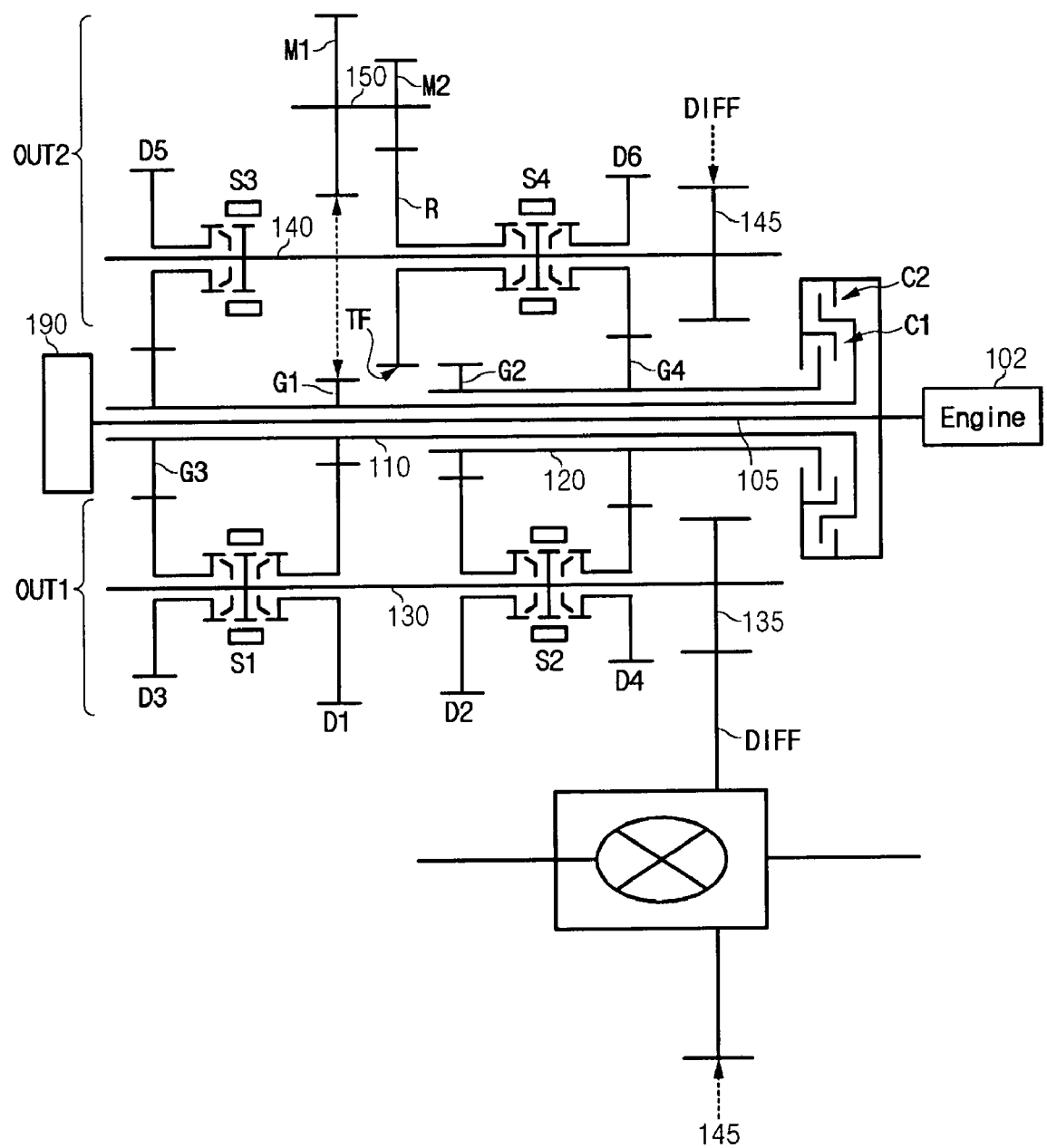
FIG. 4 is a schematic diagram of a double clutch transmission according to a third embodiment of the present invention.

FIG. 4 is a schematic diagram of a double clutch transmission according to a third embodiment of the present invention. As shown in FIG. 4, a double clutch transmission according to a third embodiment of the present invention includes a main input shaft 105, first and second input shafts 110 and 120, first and second clutches C1 and C2, first, second, third, and fourth drive gears G1, G2, G3, and G4, first and second output devices OUT1 and OUT2, and a differential gear DIFF.

Details of the main input shaft 105, first and second input shafts 110 and 120, first and second clutches C1 and C2, and the cooperative relationship thereamong of a double clutch transmission according to a third embodiment are the same as has been described in connection with the first embodiment.

The first and third drive gears G1 and G3 according to the third embodiment are formed on the first input shaft 110, and the second and fourth drive gears G2 and G4 are formed on the second input shaft 120. In further detail, the first and third drive gears G1 and G3 may be disposed on the first input shaft 110 such that an end of the second input shaft 120 is closer to the first drive gear G1 than to the third drive gear G3. In addition, the second and fourth drive gears G2 and G4 are disposed on the second input shaft 120 such that the engine 102 is closer to the fourth drive gear G4 than to the second drive gear G2. In other words, regarding disposition of such drive gears, referring to FIG. 4 related to a third embodiment of the present invention, the first, second, third, and fourth drive gears G1, G2, G3, and G4 are disposed in a sequence of the third drive gear G3, the first drive gear G1, the second drive gear G2, and the fourth drive gear G4.

As shown in FIG. 4, a double clutch transmission according to a third embodiment of the present invention further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, third, and fourth drive gears G1, G3, and G4, and outputs the changed torques.

As shown in FIG. 4, the first output device OUT1 includes a first output shaft 130; first, second, third, and fourth driven gears D1, D2, D3, and D4; first and second synchronizing devices S1 and S2; and a first output gear 135.

The first output shaft 130 is disposed parallel to and apart from the main input shaft 105 by a predetermined distance. The first, second, third, and fourth driven gears D1, D2, D3, and D4 are disposed on the first output shaft 130, and are respectively engaged with the first, second, third, and fourth drive gears G1, G2, G3, and G4.

The first synchronizing device S1 selectively transmits torques of the first and third driven gears D1 and D3 to the first output shaft 130. The second synchronizing device S2 selectively transmits torques of the second and fourth driven gears D2 and D4 to the first output shaft 130. In addition, the first output gear 135 is disposed on the first output shaft 130 and is engaged with the differential gear DIFF such that selectively changed torques of the first, second, third, and fourth drive gears G1, G2, G3, and G4 may be output therethrough to the differential gear DIFF.

As shown in FIG. 4, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145. The second output shaft 140 is disposed parallel to and apart from the main input shaft 105 by a predetermined distance. The fifth and sixth driven gears D5 and D6 are disposed on the second output shaft 140, and are respectively engaged with the third and fourth drive gears G3 and G4.

The first mediating gear M1 is engaged with the first drive gear G1, and the second mediating gear M2 is connected to the first mediating gear M1 by an idle shaft 150.

The reverse driven gear R is engaged with the second mediating gear M2 and is disposed on the second output shaft 140 between the first mediating gear M1 and sixth driven gear D6. Gear teeth (more specifically, the outer surface of gear teeth) TF of the reverse driven gear R lie close to an exterior circumference of the first input shaft between the first and second drive gears G1 and G2.

The third synchronizing device S3 selectively transmits a torque from the fifth driven gear D5 to the second output shaft 140. The fourth synchronizing device S4 selectively transmits torques from the sixth driven gear D6 and the reverse driven gear R to the second output shaft 140. In addition, the second output gear 145 is disposed on the second output shaft 140 and is engaged with the differential gear DIFF such that selectively changed torques of the first, third, and fourth drive gears G1, G3, and G4 may be output therethrough to the differential gear DIFF.

Details of the first, second, third, and fourth synchronizing devices S1, S2, S3, and S4 are the same as has been described in connection with the first embodiment. Differences related to the first, second, third, and fourth synchronizing devices S1, S2, S3, and S4 in comparison with the first embodiment are as follows. The first driven gear D1 is connected to the right of the first synchronizing device S1, and the third driven gear D3 is connected to the left thereof. Regarding the third synchronizing device S3, only the fifth driven gear D5 is connected to the left thereof. The reverse driven gear R is connected to the left of the fourth synchronizing device D4 in this third embodiment.

FIG. 4 does not illustrate a connection between the first mediating gear M1 and the first drive gear G1, or a connection between the second output shaft 140 and the differential gear DIFF. As in the first embodiment, this is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF is the same as has been described in connection with the first embodiment with reference to FIG. 2.

According to such structural features of a double clutch transmission, disposition of only four drive gears on input shafts may enable a total of seven speeds, i.e., six forward speeds and one reverse speed. Therefore, a length of a forward six-speed double clutch transmission may be shortened. In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

In addition, the reverse driven gear R is disposed at a position such that some of the gear teeth (more specifically, the outer surface of the gear teeth) TF of the reverse driven gear are close to an exterior circumference of the first input shaft 110 between the first and second drive gears G1 and G2. Therefore, the diameter of the reverse driven gear R may be maximized so as to realize a maximal reduction ratio for a reverse speed of as large as a reduction ratio for a first speed.

Referring to FIG. 4, shifting operations of such a double clutch transmission according to a third embodiment of the present invention are hereinafter described in detail. For shifting operations of a double clutch transmission to second, fourth, and sixth speeds according to a third embodiment of the present invention, clutches and synchronizing devices are operated in the same manner that has been described in connection with the first embodiment.

For shifting to the first speed, the first driven gear D1 and the first output shaft 130 are synchronously engaged by operating the first synchronizing device S1 to the right in FIG. 4. This is performed while clutch C2 is operated and clutch C1 is released.

For shifting to the third speed, firstly, the third driven gear D3 and the first output shaft 130 are synchronously engaged by operating the first synchronizing device S1 to the left in FIG. 4. This is performed while the first clutch C1 is released and the second clutch C2 operates in the second speed.

For shifting to the fifth speed, firstly, the fifth driven gear D5 and the second output shaft 140 are synchronously engaged by operating the third synchronizing device S3 to the left in FIG. 4. This is performed while the first clutch C1 is released and the second clutch C2 operates.

For shifting to the reverse speed, firstly, the reverse driven gear R and the second output shaft 140 are synchronously engaged by operating the fourth synchronizing device S4 to the left in FIG. 4. This is performed while the first clutch C1 is released and the second clutch C2 operates. The reverse speed having a large reduction ratio of as much as that of the first speed.

Figure 5:
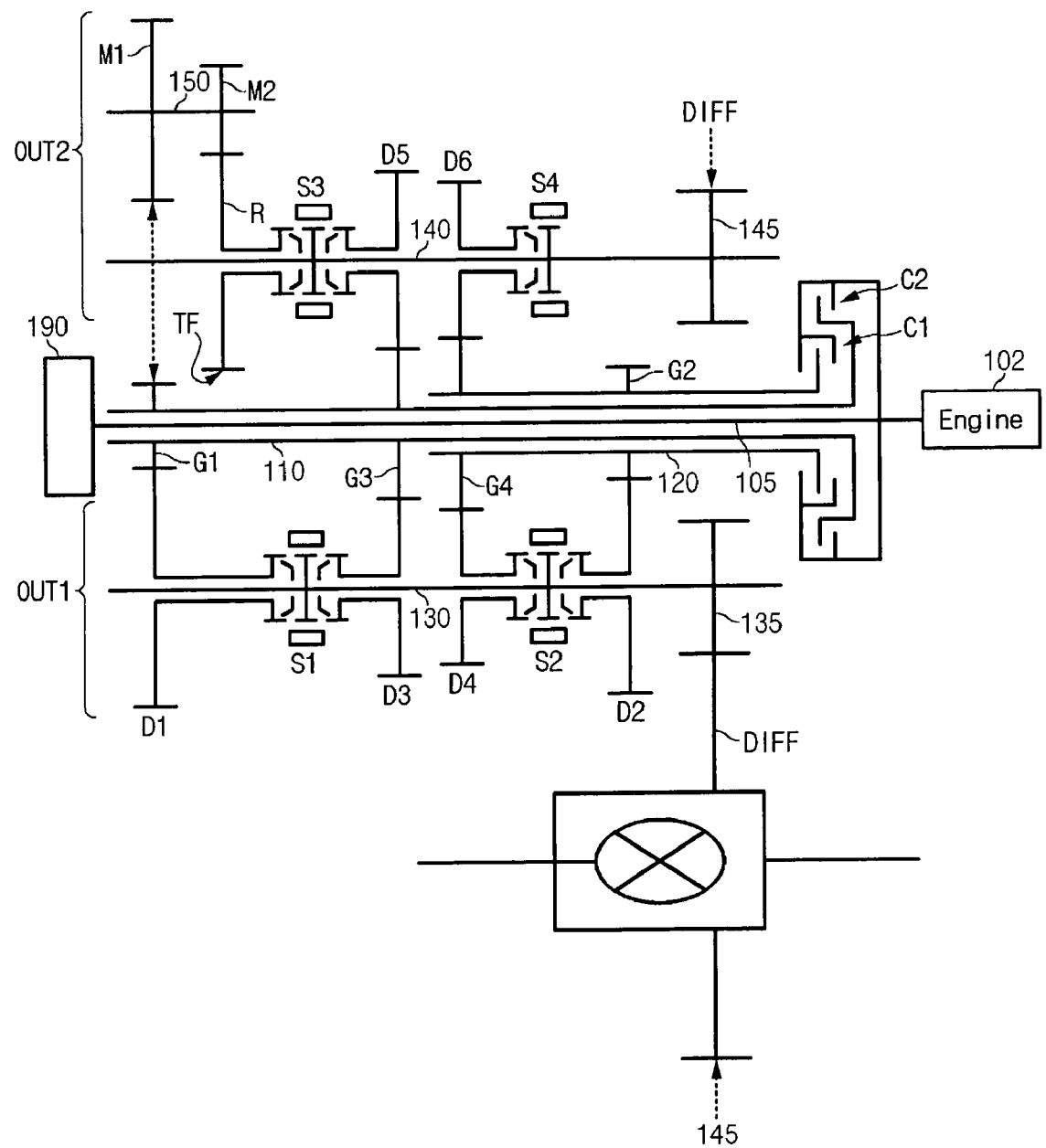
FIG. 5 is a schematic diagram of a double clutch transmission according to a fourth embodiment of the present invention.

FIG. 5 is a schematic diagram of a double clutch transmission according to a fourth embodiment of the present invention. As shown in FIG. 5, a double clutch transmission according to a fourth embodiment of the present invention includes a main input shaft 105; first and second input shafts 110 and 120; first and second clutches C1 and C2; first, second, third, and fourth drive gears G1, G2, G3, and G4; first and second output devices OUT1 and OUT2; and a differential gear DIFF.

Details of the main input shaft 105, first and second input shafts 110 and 120, first and second clutches C1 and C2, and cooperative relationship thereamong of a double clutch transmission according to a fourth embodiment are the same as has been described in connection with the first embodiment.

The first and third drive gears G1 and G3 according to the fourth embodiment are formed on the first input shaft 110, and the second and fourth drive gears G2 and G4 are formed on the second input shaft 120. In further detail, the first and third drive gears G1 and G3 may be disposed on the first input shaft 110 such that an end of the second input shaft 120 is closer to the third drive gear G3 than to the first drive gear G1. In addition, the second and fourth drive gears G2 and G4 may be disposed on the second input shaft 120 such that the engine 102 is closer to the second drive gear G2 than to the fourth drive gear G4.

In other words, regarding disposition of such drive gears, referring to FIG. 5 related to a fourth embodiment of the present invention, the first, second, third, and fourth drive gears G1, G2, G3, and G4 are disposed in a sequence of the first drive gear G1, the third drive gear G3, the fourth drive gear G4, and the second drive gear G2.

As shown in FIG. 5, a double clutch transmission according to a fourth embodiment of the present invention further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, third, and fourth drive gears G1, G3, and G4, and outputs the changed torques.

As shown in FIG. 5, the first output device OUT1 includes a first output shaft 130; first, second, third, and fourth driven gears D1, D2, D3, and D4; first and second synchronizing devices S1 and S2; and a first output gear 135. The first output shaft 130 is disposed parallel to and apart from the main input shaft 105 by a predetermined distance. The first, second, third, and fourth driven gears D1, D2, D3, and D4 are disposed on the first output shaft 130, and they are respectively engaged with the first, second, third, and fourth drive gears G1, G2, G3, and G4.

The first synchronizing device S1 selectively transmits torques from the first and third driven gears D1 and D3 to the first output shaft 130. The second synchronizing device S2 selectively transmits torques from the second and fourth driven gears D2 and D4 to the first output shaft 130. In addition, the first output gear 135 is disposed on the first output shaft 130 and engaged with the differential gear DIFF such that selectively changed torques of the first, second, third, and fourth drive gears G1, G2, G3, and G4 may be output therethrough to the differential gear DIFF.

As shown in FIG. 5, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145. The second output shaft 140 is disposed parallel to and apart from the main input shaft 105 by a predetermined distance. The fifth and sixth driven gears D5 and D6 are disposed on the second output shaft 140, and are respectively engaged with the third and fourth drive gears G3 and G4.

The first mediating gear M1 is engaged with the first drive gear G1, and the second mediating gear M2 is connected to the first mediating gear M1 by an idle shaft 150. The reverse driven gear R is engaged with the second mediating gear M2 and is disposed on the second output shaft 140 between the first mediating gear M1 and fifth driven gear D5. Gear teeth (more specifically, the outer surface of gear teeth) TF of the reverse driven gear R lie close to an exterior circumference of the first input shaft between the first and third drive gears G1 and G3.

The third synchronizing device S3 selectively transmits torques from the fifth driven gear D5 and the reverse driven gear R to the second output shaft 140. The fourth synchronizing device S4 selectively transmits a torque from the sixth driven gear D6 to the second output shaft 140. In addition, the second output gear 145 is disposed on the second output shaft 140 and engaged with the differential gear DIFF such that selectively changed torques of the first, third, and fourth drive gears G1, G3, and G4 may be output therethrough to the differential gear DIFF.

Details of the first, second, third, and fourth synchronizing devices S1, S2, S3, and S4 are the same as has been described in connection with the first embodiment. Differences related to the first, second, third, and fourth synchronizing devices S1, S2, S3, and S4 in comparison with the first embodiment are as follows: the second driven gear D2 is connected to the right of the second synchronizing device S2, and the left fourth driven gear D4 is connected to the left thereof; the sixth driven gear D6 is connected to the left of the fourth synchronizing device D4.

FIG. 5 does not illustrate a connection between the first mediating gear M1 and the first drive gear G1, or a connection between the second output shaft 140 and the differential gear DIFF. As in the first embodiment, this is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF is the same as has been described in connection with the first embodiment with reference to FIG. 2.

According to such structural features of a double clutch transmission, disposition of only four drive gears on input shafts may enable a total of seven speeds, i.e., six forward speeds and one reverse speed. Therefore, a length of a forward six-speed double clutch transmission may be shortened. In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

In addition, the reverse driven gear R is disposed at a position in which the gear teeth (more specifically, the outer surface of the gear teeth) TF of the reverse driven gear are close to an exterior circumference of the first input shaft 110 between the first and third drive gears G1 and G3. Therefore, the diameter of the reverse driven gear R may be maximized so as to realize a maximal reduction ratio for a reverse speed of as large as a reduction ratio for a first speed.

Referring to FIG. 5, shifting operations of such a double clutch transmission according to a fourth embodiment of the present invention are hereinafter described in detail. For shifting operations of a double clutch transmission to first, third, fifth, and reverse speeds according to a fourth embodiment of the present invention, clutches and synchronizing devices are operated in the same manner that has been described in connection with the first embodiment.

For shifting to the second speed, firstly, the second driven gear D2 and the first output shaft 130 are synchronously engaged by operating the second synchronizing device S2 to the right in FIG. 5 while the first clutch C1 operates and the second clutch C2 is released. For shifting to the fourth speed, firstly, the fourth driven gear D4 and the first output shaft 130 are synchronously engaged by operating the second synchronizing device S2 to the left in FIG. 5 while the first clutch C1 operates and the second clutch C2 is released. For shifting to the sixth speed, firstly, the sixth driven gear D6 and the second output shaft 140 are synchronously engaged by operating the fourth synchronizing device S4 to the left in FIG. 5 while the first clutch C1 operates and the second clutch C2 is released.

Figure 6:
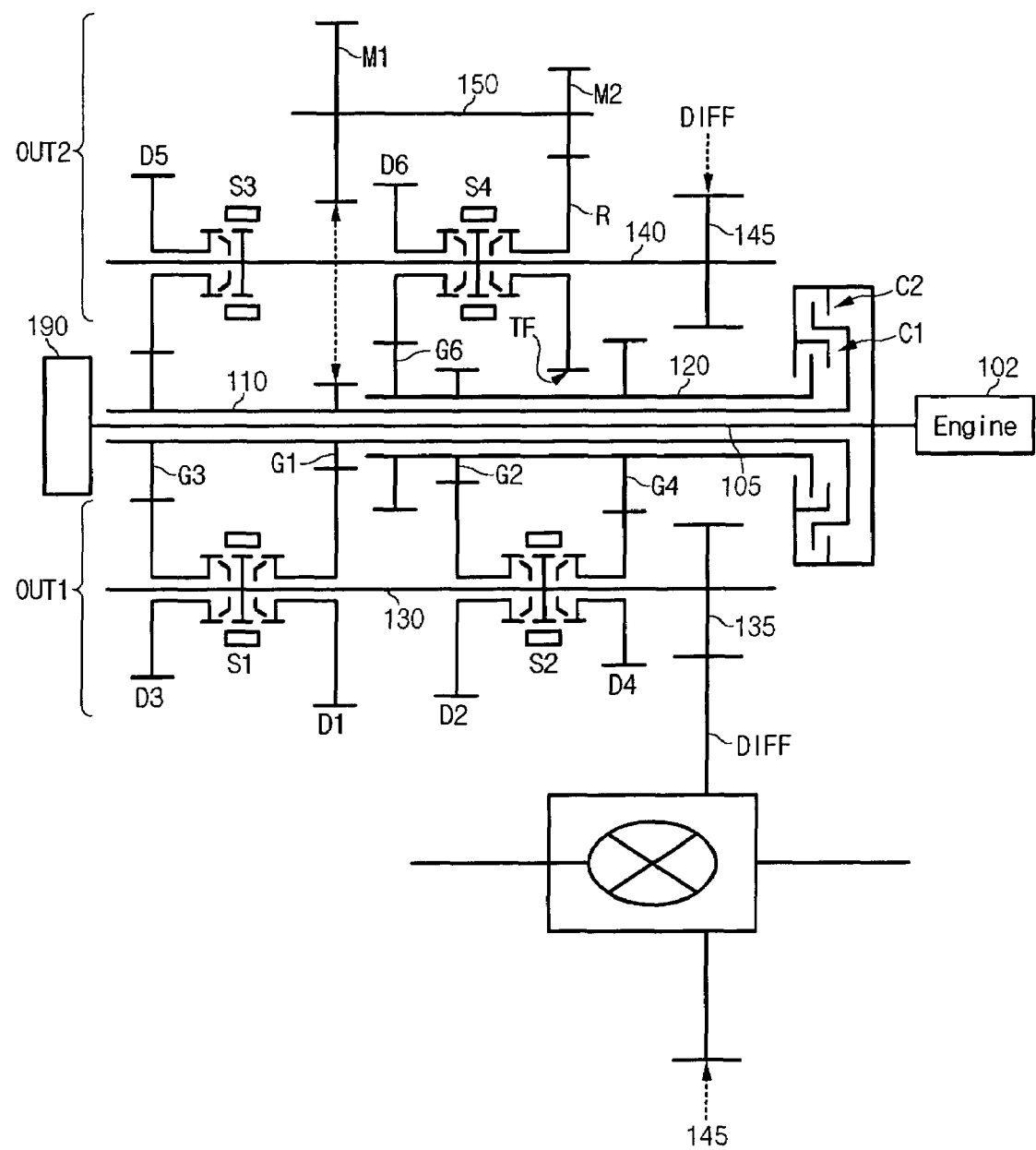
FIG. 6 is a schematic diagram of a double clutch transmission according to a fifth embodiment of the present invention.

FIG. 6 is a schematic diagram of a double clutch transmission according to a fifth embodiment of the present invention. As shown in FIG. 6, a double clutch transmission according to a fifth embodiment of the present invention includes a main input shaft 105; first and second input shafts 110 and 120; first and second clutches C1 and C2; first, second, third, fourth, and sixth drive gears G1, G2, G3, G4, and G6; first and second output devices OUT1 and OUT2; and a differential gear DIFF.

Details of the main input shaft 105, first and second input shafts 110 and 120, first and second clutches C1 and C2, and cooperative relationship thereamong of a double clutch transmission according to a fifth embodiment are the same as has been described in connection with the first embodiment. The first and third drive gears G1 and G3 according to the fifth embodiment are formed on the first input shaft 110, and the second, fourth, and sixth drive gears G2, G4, and G6 are formed on the second input shaft 120.

In further detail, the first and third drive gears G1 and G3 are disposed on the first input shaft 110 such that an end of the second input shaft 120 is closer to the first drive gear G1 than to the third drive gear G3. In addition, the second and fourth drive gears G2 and G4 are disposed on the second input shaft 120 such that the engine 102 is closest to the fourth drive gear G4, further from the second drive gear G2, and farthest from the sixth drive gear G6.

In other words, regarding disposition of such drive gears, referring to FIG. 6 related to a fifth embodiment of the present invention, the first, second, third, fourth, and sixth drive gears G1, G2, G3, G4, and G6 are disposed in a sequence of the third drive gear G3, the first drive gear G1, the sixth drive gear G6, the second drive gear G2, and the fourth drive gear G4.

As shown in FIG. 6, a double clutch transmission according to a fifth embodiment of the present invention further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, third, and sixth drive gears G1, G3, and G6, and outputs the changed torques.

As shown in FIG. 6, the first output device OUT1 includes a first output shaft 130; first, second, third, and fourth driven gears D1, D2, D3, and D4; first and second synchronizing devices S1 and S2; and a first output gear 135. The first output shaft 130 is disposed parallel to and apart from the main input shaft 105 by a predetermined distance. The first, second, third, and fourth driven gears D1, D2, D3, and D4 are disposed on the first output shaft 130, and they are respectively engaged with the first, second, third, and fourth drive gears G1, G2, G3, and G4.

The first synchronizing device S1 selectively transmits torques of the first and third driven gears D1 and D3 to the first output shaft 130. The second synchronizing device S2 selectively transmits torques of the second and fourth driven gears D2 and D4 to the first output shaft 130. In addition, the first output gear 135 is disposed on the first output shaft 130 and engaged with the differential gear DIFF such that selectively changed torques of the first, second, third, and fourth drive gears G1, G2, G3, and G4 may be output therethrough to the differential gear DIFF.

As shown in FIG. 6, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145. The second output shaft 140 is disposed parallel to and apart from the main input shaft 105 by a predetermined distance. The fifth and sixth driven gears D5 and D6 are disposed on the second output shaft 140, and are respectively engaged with the third and sixth drive gears G3 and G6.

The first mediating gear M1 is engaged with the first drive gear G1, and the second mediating gear M2 is connected to the first mediating gear M1 by an idle shaft 150. The reverse driven gear R is engaged with the second mediating gear M2 and is disposed on the second output shaft 140 between the sixth driven gear D6 and the second output gear 145. Gear teeth (more specifically, the outer surface of gear teeth) TF of the reverse driven gear R lie close to an exterior circumference of the first input shaft between the second and fourth drive gears G2 and G4.

The third synchronizing device S3 selectively transmits a torque of the fifth driven gear D5 to the second output shaft 140. The fourth synchronizing device S4 selectively transmits torques of the sixth driven gear D6 and the reverse driven gear R to the second output shaft 140. In addition, the second output gear 145 is disposed on the second output shaft 140 and engaged with the differential gear DIFF such that selectively changed torques of the first, third, and sixth drive gears G1, G3, and G6 may be output therethrough to the differential gear DIFF.

Details of the first, second, third, and fourth synchronizing devices S1, S2, S3, and S4 are the same as have been described in connection with the first embodiment. Differences related to the first, second, third, and fourth synchronizing devices S1, S2, S3, and S4 in comparison with the first embodiment are as follows. The first driven gear D1 is connected to the right of the first synchronizing device S1, and the third driven gear D3 is connected to the left thereof. The sixth driven gear D6 is connected to the left of fourth synchronizing device S4, and the reverse driven gear R is connected to the right thereof.

FIG. 6 does not illustrate a connection between the first mediating gear M1 and the first drive gear G1, or a connection between the second output shaft 140 and the differential gear DIFF. As in the first embodiment, this is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF is the same as has been described in connection with the first embodiment with reference to FIG. 2.

According to such structural features of a double clutch transmission, disposition of only five drive gears on input shafts may enable a total of seven speeds, i.e., six forward speeds and one reverse speed. Therefore, a length of a forward six-speed double clutch transmission may be shortened. In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

The reverse driven gear R is disposed at a position such that some of the gear teeth (more specifically, the outer surface of the gear teeth) TF of the reverse driven gear are close to an exterior circumference of the second input shaft 120 between the second and fourth drive gears G2 and G4. Therefore, the diameter of the reverse driven gear R may be maximized so as to realize a maximal reduction ratio for a reverse speed as large as a reduction ratio for a first speed.

Referring to FIG. 6, shifting operations of such a double clutch transmission according to a fifth embodiment of the present invention are hereinafter described in detail. For shifting operations of a double clutch transmission to second and fourth speeds according to a fifth embodiment of the present invention, clutches and synchronizing devices are operated in the same manner as has been described in connection with the first embodiment.

For shifting to the first speed, the first driven gear D1 and the first output shaft 130 are synchronously engaged by operating the first synchronizing device S1 to the right in FIG. 6. This is performed while the first clutch C1 is released and the second clutch C2 is operated. For shifting to the third speed, firstly, the third driven gear D3 and the first output shaft 130 are synchronously engaged by operating the first synchronizing device S1 to the left in FIG. 6 while the first clutch C1 is released and the second clutch C2 operates. For shifting to the fifth speed, firstly, the fifth driven gear D5 and the second output shaft 140 are synchronously engaged by operating the third synchronizing device S3 to the left in FIG. 6. This is performed while the first clutch C1 is released and the second clutch C2 operates.

For shifting to the sixth speed, firstly, the sixth driven gear D6 and the second output shaft 140 are synchronously engaged by operating the fourth synchronizing device S4 to the left in FIG. 6. This is performed while the first clutch C1 operates and the second clutch C2 is released.

For shifting to the reverse speed, firstly, the reverse driven gear R and the second output shaft 140 are synchronously engaged by operating the fourth synchronizing device S4 to the right in FIG. 6. This is performed while the first clutch C1 is released and the second clutch C2 operates. The reverse speed preferably has as large reduction ratio as that of the first speed.

Figure 7:
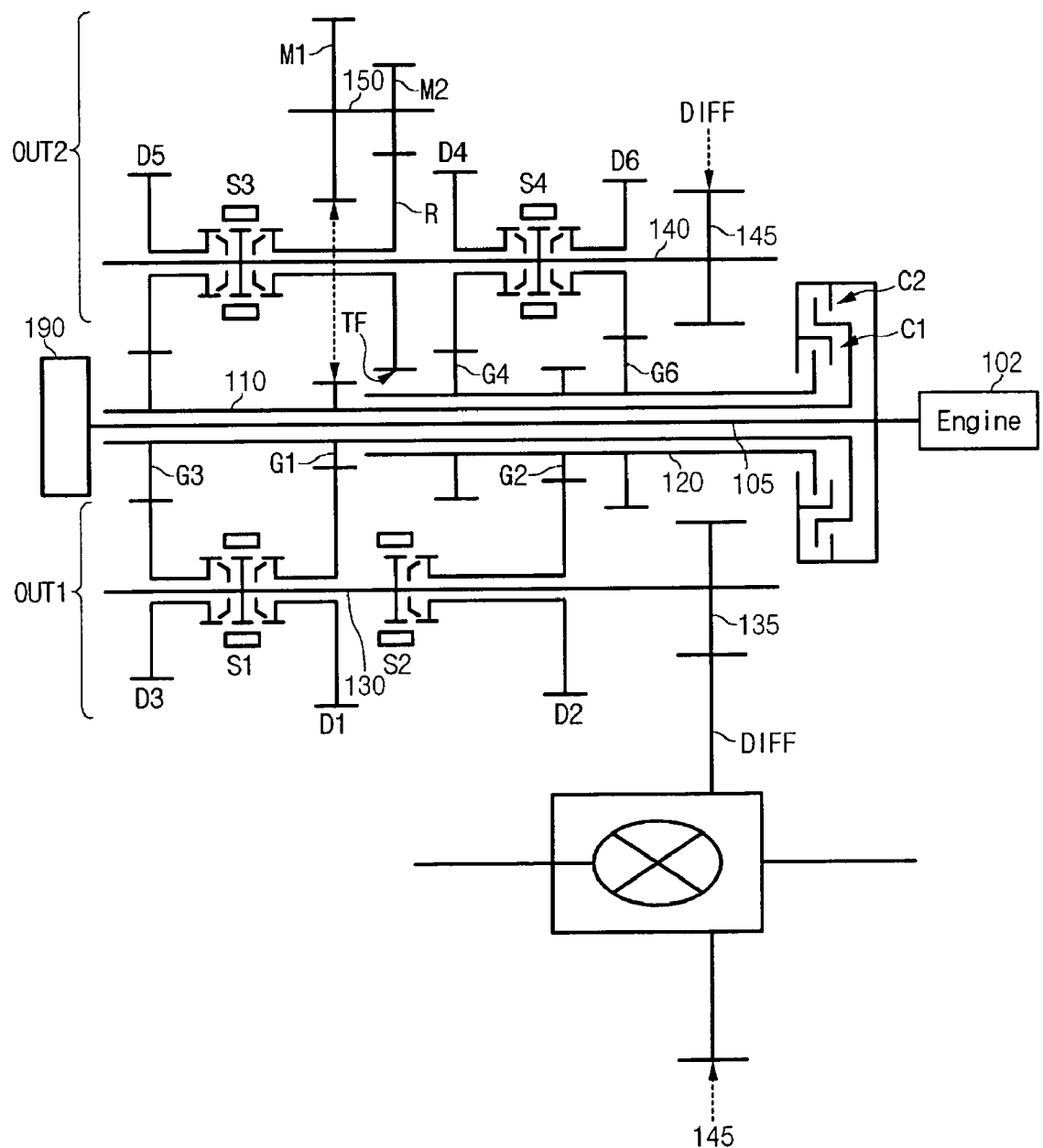
FIG. 7 is a schematic diagram of a double clutch transmission according to a sixth embodiment of the present invention.

FIG. 7 is a schematic diagram of a double clutch transmission according to a sixth embodiment of the present invention. As shown in FIG. 7, a double clutch transmission according to a sixth embodiment of the present invention includes a main input shaft 105; first and second input shafts 110 and 120; first and second clutches C1 and C2; first, second, third, fourth, and sixth drive gears G1, G2, G3, G4, and G6; first and second output devices OUT1 and OUT2; and a differential gear DIFF. Details of the main input shaft 105, first and second input shafts 110 and 120, first and second clutches C1 and C2, and the cooperative relationship thereamong of a double clutch transmission according to a sixth embodiment are the same as have been described in connection with the first embodiment. The first and third drive gears G1 and G3 according to the sixth embodiment are formed on the first input shaft 110, and the second, fourth, and sixth drive gears G2, G4, and G6 are formed on the second input shaft 120.

In further detail, the first and third drive gears G1 and G3 are disposed on the first input shaft 110 such that an end of the second input shaft 120 is closer to the first drive gear G1 than to the third drive gear G3. In addition, the second and fourth drive gears G2 and G4 are disposed on the second input shaft 120 such that the engine 102 is closest to the sixth drive gear G6, further from the second drive gear G2, and farthest from the fourth drive gear G4. In other words, regarding disposition of such drive gears, referring to FIG. 7 related to a sixth embodiment of the present invention, the first, second, third, fourth, and sixth drive gears G1, G2, G3, G4, and G6 are disposed in a sequence of the third drive gear G3, the first drive gear G1, the fourth drive gear G4, the second drive gear G2, and the sixth drive gear G6.

As shown in FIG. 7, a double clutch transmission according to a sixth embodiment of the present invention further includes a first output device OUT1 and a second output device OUT2. The first output device OUT1 selectively changes torques of the first, second, and third drive gears G1, G2, and G3, and outputs the changed torques. The second output device OUT2 selectively changes torques of the first, third, fourth, and sixth drive gears G1, G3, G4, and G6, and outputs the changed torques.

As shown in FIG. 7, the first output device OUT1 includes a first output shaft 130; first, second, and third driven gears D1, D2, and D3; first and second synchronizing devices S1 and S2; and a first output gear 135. The first output shaft 130 is disposed parallel to and apart from the main input shaft 105 by a predetermined distance. The first, second, and third driven gears D1, D2, and D3 are disposed on the first output shaft 130, and they are respectively engaged with the fist, second, and third drive gears G1, G2, and G3.

The first synchronizing device S1 selectively transmits torques of the first and third driven gears D1 and D3 to the first output shaft 130. The second synchronizing device S2 selectively transmits a torque of the second driven gear D2 to the first output shaft 130. In addition, the first output gear 135 is disposed on the first output shaft 130 and engaged with the differential gear DIFF such that selectively changed torques of the first, second, and third drive gears G1, G2, and G3 may be output therethrough to the differential gear DIFF.

As shown in FIG. 7, the second output device OUT2 includes a second output shaft 140; fourth, fifth, and sixth driven gears D4, D5, and D6; first and second mediating gears M1 and M2; a reverse driven gear R; third and fourth synchronizing devices S3 and S4; and a second output gear 145. The second output shaft 140 is disposed parallel to and apart from the main input shaft 105 by a predetermined distance. The fourth, fifth, and sixth driven gears D4, D5, and D6 are disposed on the second output shaft 140, and are respectively engaged with the fourth, third, and sixth drive gears G4, G3, and G6.

The first mediating gear M1 is engaged with the first drive gear G1, and the second mediating gear M2 is connected to the first mediating gear M1 by an idle shaft 150. The reverse driven gear R is engaged with the second mediating gear M2 and is disposed on the second output shaft 140 between the first mediating gear M1 and the fourth driven gear D4. Gear teeth (more specifically, the outer surface of gear teeth) TF of the reverse driven gear R lie close to an exterior circumference of the second input shaft 120 between the first and fourth drive gears G1 and G4.

The third synchronizing device S3 selectively transmits torques of the fifth driven gear D5 and the reverse driven gear R to the second output shaft 140. The fourth synchronizing device S4 selectively transmits torques of the fourth driven gear D4 and the sixth driven gear D6 to the second output shaft 140. In addition, the second output gear 145 is disposed on the second output shaft 140 and engaged with the differential gear DIFF such that selectively changed torques of the first, third, and sixth drive gears G1, G3, and G6 may be output therethrough to the differential gear DIFF.

Details of the first, second, third, and fourth synchronizing devices S1, S2, S3, and S4 are the same as have been described in connection with the first embodiment. Differences related to the first, second, third, and fourth synchronizing devices S1, S2, S3, and S4 in comparison with the first embodiment are as follows. The first driven gear D1 is connected to the right of the first synchronizing device S1, and the third driven gear D3 is connected to the left thereof. Regarding the second synchronizing device S2, only the second driven gear D2 is connected to the right thereof. The fifth driven gear D5 is connected to the left of the synchronizing device S3, and the reverse driven gear R is connected to the right thereof. The fourth driven gear D4 is connected to the left of the fourth synchronizing device D4 in this third embodiment.

FIG. 7 does not illustrate a connection between the first mediating gear M1 and the first drive gear G1, or a connection between the second output shaft 140 and the differential gear DIFF. As in the first embodiment, this is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF is the same as has been described in connection with the first embodiment with reference to FIG. 2.

According to such structural features of a double clutch transmission, disposition of only five drive gears on input shafts may enable totally seven speeds, i.e., forward six speeds and reverse one speed. Therefore, a length of a forward six-speed double clutch transmission may be shortened.

In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

In addition, the reverse driven gear R is disposed at a position such that some of the gear teeth (more specifically, the outer surface of the gear teeth) TF of the reverse driven gear are close to an exterior circumference of the second input shaft 120 between the first and fourth drive gears G1 and G4. Therefore, the diameter of the reverse driven gear R may be maximized so as to realize a maximal reduction ratio for a reverse speed of as large as a reduction ratio for a first speed.

Referring to FIG. 7, shifting operations of such a double clutch transmission according to a sixth embodiment of the present invention are hereinafter described in detail. For shifting operations of a double clutch transmission to a sixth speed according to a sixth embodiment of the present invention, clutches and synchronizing devices are operated in the same manner as has been described in connection with the first embodiment.

For shifting to the first speed, the first driven gear D1 and the first output shaft 130 are synchronously engaged by operating the first synchronizing device S1 to the right in FIG. 7. This is performed while the first clutch is released and the second clutch is operated. For shifting to the second speed, the second driven gear D2 and the first output shaft 130 are synchronously engaged by operating the second synchronizing device S2 to the right in FIG. 7. This is performed while the first clutch is operated and the second clutch released. For shifting to the third speed, firstly, the third driven gear D3 and the first output shaft 130 are synchronously engaged by operating the first synchronizing device S1 to the left in FIG. 7. This is performed while the first clutch C1 is released and the second clutch C2 operates.

For shifting to the fourth speed, firstly, the fourth driven gear D4 and the second output shaft 140 are synchronously engaged by operating the fourth synchronizing device S4 to the left in FIG. 7. This is performed while the second clutch C2 is released and the first clutch C1 operates. For shifting to the fifth speed, firstly, the fifth driven gear D5 and the second output shaft 140 are synchronously engaged by operating the third synchronizing device S3 to the left in FIG. 7. This is performed while the first clutch C1 is released and the second clutch C2 operates. For shifting to the reverse speed, firstly, the reverse driven gear R and the second output shaft 140 are synchronously engaged by operating the third synchronizing device S3 to the right in FIG. 7. This is performed while the first clutch C1 is released and the second clutch C2 operates. The reverse speed has as large a reduction ratio as that of the first speed.

According to an embodiment of the present invention, disposition of only four or five drive gears on input shafts may enable a total of seven speeds, i.e., six forward speeds and one reverse speed. Therefore, a length of a forward six-speed double clutch transmission may be greatly shortened. Therefore, the number of gears required for realization of six forward speeds is reduced. Accordingly, the transmission may be more light-weight and a manufacturing process of a transmission may be simplified.

In addition, the length of the idle shaft 150 for a reverse speed may be greatly shortened, and accordingly the transmission may be further decreased in weight. It also contributes to a reduction of rotational inertia of the idle shaft 150, and an enhancement of torque transmission efficiency. In addition, for shifting to an adjacent speed, one of the first and second clutches is released and the other thereof is operated. Therefore, continuous power transmission of a transmission may be achieved by controlling the two clutches.

In addition, a release of a current speed and a realization of a target speed may be independently controlled during shifting from and to adjacent speeds, since adjacent speeds require different synchronizing devices to be operated. Also, the reverse driven gear is axially offset from any of drive gears on the first and second input shafts such that gear teeth of the reverse driven gear is as close as possible to an exterior circumference of one of the first and second input shafts. Accordingly, the reverse speed has as large a reduction ratio as that of the first speed.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A double clutch transmission comprising:
a main input shaft for receiving an engine torque;
a first input shaft rotating coaxially with the main input shaft;
a second input shaft rotating both coaxially with the main input shaft and about an exterior circumference of the first input shaft;

first and second clutches for selectively transmitting the engine torque of the main input shaft to the first and second input shafts, respectively;

a drive gear unit including a plurality of drive gears disposed respectively on the first and second input shafts;

a first output device including a first output shaft disposed parallel to and apart from the main input shaft by a predetermined distance and having a plurality of driven gears and a first output gear thereon, such that torques of drive gears on the first and second input shafts are selectively changed and output;

a second output device including a second output shaft disposed parallel to and apart from the main input shaft by a predetermined distance and having a plurality of driven gears, a second output gear, and a reverse driven gear thereon, such that torques of drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts;

and wherein the drive gear unit comprises:

first and third drive gears on one of the first and second input shafts; and second, fourth, and sixth drive gears on another of the first and second input shafts.

2. The double clutch transmission of claim 1, wherein:

the first and third drive gears are disposed on the first input shaft; and the second, fourth, and sixth drive gears are disposed on the second input shaft.

3. The double clutch transmission of claim 1, wherein the first output device comprises:

the first output shaft;

first, second, and third driven gears disposed on the first output shaft and respectively engaged with the first, second, and third drive gears;

a first synchronizing device for selectively transmitting torques of the first and third driven gears to the first output shaft;

a second synchronizing device for selectively transmitting a torque of the second driven gear to the first output shaft; and the first output gear disposed on the first output shaft and engaged with the differential gear, such that torque of the first, second, and third drive gears on the first and second input shafts are selectively changed and output.

4. The double clutch transmission of claim 1, wherein the second output device comprises:

the second output shaft;

fourth, fifth, and sixth driven gears disposed on the second output shaft and respectively engaged with the fourth, third, and sixth drive gears;

a first mediating gear engaged with the first drive gear;

a second mediating gear connected to the first mediating gear by an idle shaft; the reverse driven gear engaged with the second mediating gear and disposed on the second output shaft between the first mediating gear and the fourth driven gear such that some of the gear teeth of the reverse driven gear are close to the exterior circumference of one of the first and second inputs shafts between the first and fourth drive gears;

a third synchronizing device for selectively transmitting torques of the fifth driven gear and the reverse driven gear to the second output shaft;

a fourth synchronizing device for selectively transmitting torques of the fourth and sixth driven gears to the second output shaft; and the second output gear disposed on the second output shaft and engaged with the differential gear, such that torques of the first, third, fourth, and sixth drive gears on the first and second input shafts are selectively changed and output.

5. The double clutch transmission of claim 1, wherein the first, second, third, fourth, and sixth drive gears are disposed in a sequence of the third drive gear, the first drive gear, the fourth drive gear, the second drive gear, and the sixth drive gear.

6. A double clutch transmission comprising:

a main input shaft for receiving an engine torque;

a first input shaft rotating coaxially with the main input shaft;

a second input shaft rotating coaxially with the main input shaft and along an exterior circumference of the first input shaft;

first and second clutches for selectively transmitting a torque of the main input shaft to the first and second input shafts;

first and third drive gears formed on one of the first and second input shafts;

second, fourth, and sixth drive gears formed on another of the first and second input shafts;

a first output device including a first output shaft disposed parallel to and apart from the main input shaft by a predetermined distance and having a plurality of driven gears and a first output gear thereon, such that torques of the first, second, and third drive gears on the first and second input shafts are selectively changed and output;

a second output device including a second output shaft disposed parallel to and apart from the main input shaft by a predetermined distance and having a plurality of driven gears, a second output gear, and a reverse driven gear thereon, such that torques of the first, third, fourth, and sixth drive gears on the first and second input shafts are selectively changed and output; and a differential gear commonly connected to the first output gear and the second output gear, wherein the reverse driven gear is axially offset from the drive gears on the first and second input shafts such that some gear teeth of the reverse driven gear are close to an exterior circumference of one of the first and second input shafts, and wherein the first output device comprises:

the first output shaft;

first, second, and third driven gears disposed on the first output shaft and respectively engaged with the first, second, and third drive gears;

a first synchronizing device for selectively transmitting torques of the first and third driven gears to the first output shaft;

a second synchronizing device for selectively transmitting a torque of the second driven gear to the first output shaft; and the first output gear disposed on the first output shaft and engaged with the differential gear, such that torques of the first, second, and third drive gears on the first and second input shafts are selectively changed and output.

7. The double clutch transmission of claim 6, wherein:
the first drive gear is used for first and reverse speeds of the transmission;
the second drive gear is used for a second speed of the transmission;
the third drive gear is used for third and fifth speeds of the transmission;
the fourth drive gear is used for a fourth speed of the transmission; and
the sixth drive gear is used for a sixth speed of the transmission.

8. The double clutch transmission of claim 6, wherein the second output device comprises:
the second output shaft;
fourth, fifth, and sixth driven gears disposed on the second output shaft and respectively engaged with the fourth, third, and sixth drive gears;
a first mediating gear engaged with the first drive gear;
a second mediating gear connected to the first mediating gear by an idle shaft;
the reverse driven gear engaged with the second mediating gear and disposed on the second output shaft between the first mediating gear and the fourth driven gear such that some of the gear teeth of the reverse driven gear are close to an exterior circumference of the second input shaft between the first and fourth drive gears;
a third synchronizing device for selectively transmitting torques of the fifth driven gear and the reverse driven gear to the second output shaft;
a fourth synchronizing device for selectively transmitting torques of the forth driven gear and sixth driven gear to the second output shaft; and
the second output gear disposed on the second output shaft and engaged with the differential gear,
such that torques of the first, third, fourth, and sixth drive gears on the first and second input shafts are selectively changed and output.

9. The double clutch transmission of claim 6, wherein the first, second, third, fourth, and sixth drive gears are disposed in a sequence of the third drive gear, the first drive gear, the fourth drive gear, the second drive gear, and the sixth drive gear.

* * * * *